(12) United States Patent
Parks

(10) Patent No.: US 9,758,944 B2
(45) Date of Patent: Sep. 12, 2017

(54) FREE-FLOWING WATERPROOFING SYSTEM

(71) Applicant: Jody V. Parks, Roaring River, NC (US)

(72) Inventor: Jody V. Parks, Roaring River, NC (US)

(73) Assignee: Parks Waterproofing, LLC, Roaring River, NC (US)

(*) Notice: Subject to any disclaimer, the term of this patent is extended or adjusted under 35 U.S.C. 154(b) by 0 days.

(21) Appl. No.: 15/099,006

(22) Filed: Apr. 14, 2016

(65) Prior Publication Data

US 2017/0051471 A1   Feb. 23, 2017

Related U.S. Application Data

(60) Provisional application No. 62/207,967, filed on Aug. 21, 2015.

(51) Int. Cl.
| | |
|---|---|
| *E02D 19/00* | (2006.01) |
| *E02D 31/02* | (2006.01) |
| *E02D 31/12* | (2006.01) |
| *B01D 39/08* | (2006.01) |
| *C02F 1/00* | (2006.01) |
| *C02F 103/00* | (2006.01) |

(52) U.S. Cl.
CPC ........... *E02D 31/025* (2013.01); *B01D 39/08* (2013.01); *C02F 1/001* (2013.01); *E02D 31/12* (2013.01); *B01D 2201/301* (2013.01); *C02F 2103/001* (2013.01)

(58) Field of Classification Search
CPC ....... E02D 31/025; E02D 31/12; B01D 35/02; B01D 39/08; B01D 2201/301; C02F 1/001; C02F 2103/001

USPC ......................................................... 52/169.5
See application file for complete search history.

(56) References Cited

U.S. PATENT DOCUMENTS

| | | | |
|---|---|---|---|
| 3,283,460 A | 11/1966 | Patrick | |
| 3,754,362 A | 8/1973 | Daimler | |
| 4,612,742 A | 9/1986 | Bevilacqua | |
| 4,730,953 A | 3/1988 | Tarko | |
| 4,879,851 A * | 11/1989 | Boccia | E02D 31/02 52/169.14 |
| 4,943,185 A | 7/1990 | McGuckin et al. | |

(Continued)

OTHER PUBLICATIONS

International Search Report and Written Opinion received for PCT Application No. PCT/US2016/032471, dated Aug. 17, 2016, 8 pages.

*Primary Examiner* — Basil Katcheves
*Assistant Examiner* — Joshua Ihezie
(74) *Attorney, Agent, or Firm* — Pedigo Law Firm PLLC

(57) ABSTRACT

A water management system provides much improved waterproofing drainage system particularly, but not limited to foundations, new or existing. The includes a form, clean washed stone, soil separating filter cloth, backfilling soil, and drainage pipe to drain out all water away from the structure. This system is easily installed and creates an even "wall" of gravel around structural walls minimizing the costs of materials making it very cost-effective. This system removes all hydrostatic pressure from structural walls eliminating the cause of water infiltration to the interior of basement walls. Water infiltration in basement walls results in mold, mildew, high humidity, and poor air quality.

10 Claims, 16 Drawing Sheets

(56) References Cited

U.S. PATENT DOCUMENTS

| | | | |
|---|---|---|---|
| 5,017,042 A * | 5/1991 | Minor | E02D 31/02 |
| | | | 405/36 |
| 5,228,805 A | 7/1993 | Chang | |
| 5,248,225 A * | 9/1993 | Rose | E04B 1/0007 |
| | | | 405/229 |
| 5,466,092 A | 11/1995 | Semenza et al. | |
| 5,495,696 A | 3/1996 | Repka | |
| 5,836,115 A | 11/1998 | Clay et al. | |
| 5,845,456 A | 12/1998 | Read | |
| 6,230,468 B1 | 5/2001 | Klaus | |
| 6,550,190 B2 | 4/2003 | Ruiz et al. | |
| 6,904,723 B1 | 6/2005 | Moore et al. | |
| 7,114,877 B2 * | 10/2006 | Wilkerson | E02B 11/00 |
| | | | 405/36 |
| 7,114,887 B1 | 10/2006 | Rainey | |
| 7,614,822 B1 * | 11/2009 | Burritt | E03F 1/002 |
| | | | 210/170.08 |
| 7,832,150 B1 | 11/2010 | Pratt | |
| 7,836,640 B1 | 11/2010 | Pratt | |
| 7,918,055 B2 | 4/2011 | Cotten | |
| 8,186,127 B1 | 5/2012 | Pratt | |
| 8,312,682 B2 | 11/2012 | Trotter | |
| 8,820,013 B2 | 9/2014 | Fennell | |
| 2007/0294965 A1 | 12/2007 | Andras | |
| 2008/0190045 A1 | 8/2008 | Janesky | |

* cited by examiner

FREE-FLOWING WATERPROOFING SYSTEM

CROSS-REFERENCE TO RELATED APPLICATIONS

The present application claims priority from U.S. Provisional Patent Application Ser. No. 62/207,967, filed on Aug. 21, 2015 and entitled "PARKS' FREE-FLOWING WATERPROOFING SYSTEM".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the field of waterproofing systems and more particularly to systems for preventing the accumulation of water around foundations and provides a cost-effective drainage system to remove water away from foundation walls in new construction and in existing buildings and homes. The present invention also relates to the field of water management in general.

2. Description of Related Art Including Information Disclosed Under 37 CFR 1.97 and 37 CFR 1.98.

A well-known problem in homes and buildings is seepage of water into the basement, especially following periods of heavy precipitation. This seepage frequently accumulates on the walls and floor line of the basement and, if not controlled, can cause substantial damage to the interior basement walls and to the contents therein.

This water seepage is cause by hydrostatic pressure saturating the soil and "pushing" its way through basement cracks and porous building materials such as concrete block, poured cement walls, and cracked basement slabs. All these building materials are susceptible to percolation and seepage of water through the building structure itself and into the interior portion of the structure.

Various prior art has disclosed waterproofing drainage systems. U.S. Pat. No. 8,820,013 B2 discloses a plate that spans a space between a bleeder hole in a wall and a drainage trench in a floor adjacent the wall. The plate includes a base and a wall extension, substantially perpendicular to one another. The base extends from a point proximate to the wall to the trench where the base and the wall extensions are spaced apart from the floor and the wall, respectively. U.S. Pat. No. 5,836,115 A discloses A system and method for preventing the accumulation of water below and about a building, the building having a foundation built on disturbed soil, which is in turn surrounded by undisturbed soil and the foundation extending to a depth. The system includes at least one trench section about the foundation, the trench being at least as deep as the disturbed soil about foundation and having sides and a bottom.

U.S. Pat. No. 6,550,190 B2 discloses a method for draining accumulated moisture from the juncture between a wall and footing of a foundation. The method comprises excavating a channel into the floor adjacent to the wall into which a drainage conduit is placed. The drainage conduit is wrapped with a wicking fabric to draw moisture into and along the drainage conduit for conveying to a moisture collection reservoir. U.S. Pat. No. 6,904,723 B1 discloses a waterproofing and humidity control system is provided for a building which includes drain members located in trenches provided in ground beneath and adjacent the basement of the building.

Similarly, other prior arts, U.S. Pat. No. 5,495,696 A, U.S. Pat. No. 6,230,468 B1, U.S. Pat. No. 4,943,185 A, and U.S. Pat. No. 5,845,456 A also discloses different variations in waterproofing drainage systems.

In addition, there exists a number of patents, such as the prior arts mentioned, relating to the field of waterproofing which attempt to provide efficient, and cost-effective drainage systems for foundations. Such patents however, fail in many areas. None of these patented systems relieve all the hydrostatic pressure from foundation walls which is the #1 cause of wet basements, failed foundations, and failed retaining walls. All the above described patents specify complicated systems which are expensive, extremely difficult to fabricate, difficult to install, and are limited to the type of basements, structures, and foundations they can be installed on. Many of these patents cause other problems, and many of them simply do not work well or last very long.

Curtain drains have been used for water management throughout the world, however, they have been very expensive to install. Typical curtain drains are dug 12" to 3' wide. After excavation is completed, the ditch is lined with filter fabric and French drains are installed. The entire hole is then filled with clean, washed stone. Clean washed stone is very expensive causing typical curtain drains to be too expensive to use in many situations. In most curtain drains, only the first few inches behind the filter fabric gets wet proving that only a few inches of gravel is needed to effectively drain the water and manage the moisture content of the soil.

Therefore, in light problems of the above mentioned systems and other commercially available drainage systems a new and improved system is needed that accomplishes all the following:

1. Simple to install.
2. Very cost-effective.
3. Will work correctly and efficiently for the life of the structure installed upon.
4. Keeps water outside of the walls of the home or structure keeping the foundation walls dry inside and out.
5. Lowers humidity levels in the basement creating a healthier, mold free environment.
6. Protects foundation walls from corrosion caused by acidic rain water.
7. Eliminates hydrostatic pressure.
8. Drains water from around foundation rapidly and away from structure.
9. Uses no electricity.
10. Completely maintenance free.
11. Does not require interior slab that supports base of foundation wall to be removed.
12. Can be installed on any new or existing home, building, foundation, or retaining wall, regardless of type.

13. Can be used with any type of waterproofing membrane.

14. Prolongs the life of retaining walls and foundations.

15. Will never clog with silt or dirt.

16. Makes curtain drains much more affordable.

As will be seen from the subsequent description, the preferred embodiments of the present invention overcome all the shortcomings of the prior art.

BRIEF SUMMARY OF THE INVENTION

In view of the foregoing disadvantages that exist in the known types of drainage systems present in the prior art, the present invention provides a much improved waterproofing drainage system that accomplishes all the above mentioned necessary benefits and more.

The general purpose of the present invention, which will be described in greater detail, is to provide a new and improved system for eliminating water seepage into foundation walls which has all the advantages of the prior art and none of the disadvantages.

The objectives of the invention are to:

1. Provide a cost-effective, foolproof waterproofing system for the consumer.

2. Provide maintenance free, non-electrical, system that reduces energy costs.

3. Provide a system that does not require sump pumps or dehumidifiers that can cost up to $50/month just to operate.

4. Provide a much improved drainage system that can handle massive amounts of water.

5. Provide a system that removes water before it even reaches the foundation wall.

6. Provide a system that protects the waterproofing membrane from water and damage during backfill.

7. Provide a system that keeps the foundation wall dry inside and out prolonging their life.

8. Provide a system that reduces humidity levels in basement.

9. Provide a system that maintains the stability of the base of the foundation because it does not require the interior slab to be removed which in most cases, supports the base of the foundation wall.

10. Provide a system that can be installed on any structure, retaining wall, or any type of foundations, new or existing whether it be constructed with poured concrete or concrete block.

11. Provide a system that eliminates hydrostatic pressure that causes wet basements and cracked walls.

12. Provide a system that cost-effectively removes all ground water and surface water from structures or walls rapidly.

13. Provide a system that can use any type of soil (rocky or clay) for backfill.

14. Provide a system that eliminates the need for gutters in order to protect the foundation from water infiltration through the basement walls which allows for a much broader range of architectural designs on homes and buildings.

15. Provide a system that eliminates risks of flooded basements due to clogged gutters or downspouts.

16. Provide a system that can be installed further away from older structures that are not properly reinforced to prevent damage during excavation and proper compaction.

17. Provide as system that easily incorporates under slab water removal to relieve hydrostatic pressure under basement slabs eliminating risk of water seepage up through basement floor.

18. Provide a system that exits more water than backfilling entire structure with gravel by channeling water directly to drain for less than ⅓ the cost.

19. Provide a system that doesn't allow acidic rain water to "sit" against waterproofing membrane causing it to deteriorate.

20. Provide a system that allows all ground water and surface water to reach the exit drain unrestricted.

21. Provide a system that consists of proper soil compaction and free-flowing drainage.

22. Provide a system that will work without fault for the life of the structure.

23. Provide a system that will never clog due to its design.

24. Provide a system that can efficiently lower the water table around foundation structures allowing homes to be built in more areas.

25. Provide a free-flowing system that can cut the cost of curtain drains by as much as 70%.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed descriptions of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE SEVERAL VIEWS OF THE DRAWINGS

To further clarify various aspects of some example embodiments of the present invention, a more particular description of the invention will be rendered by reference to specific embodiments thereof which are illustrated in the appended drawings. It is appreciated that the drawings depict only illustrated embodiments of the invention and are therefore not to be considered limiting of its scope. The invention will be described and explained with additional specificity and detail through the use of the accompanying drawing in which.

DETAILED DESCRIPTION OF THE INVENTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein connected with the following description and the annexed drawings. These aspects are indicative, however, of but a few of the various ways in which the principles of the 20 invention can be employed and the subject invention is intended to include all such aspects and their equivalents. Other advantages and novel features of the invention will become apparent from the following detailed description of the invention when considered in conjunction with the drawings.

In some preferred embodiments, the present invention provides water management in general. The waterproofing drainage system is efficiently used for eliminating water seepage into walls. The system is also used to cost-effectively turn wet, swampy areas with massive amounts of ground water into usable land for agriculture, construction, or septic systems. The purpose of the invention is to provide a user friendly, easy to install drainage apparatus that is extremely cost effective.

This section summarizes some aspects of the present disclosure and briefly introduces some preferred embodiments. Simplifications or omissions in this section as well as in the abstract or the title of this description may be made to avoid obscuring the purpose of this section, the abstract and the title. Such simplifications or omissions are not intended to limit the scope of the present disclosure nor imply any limitations.

Figure 1:
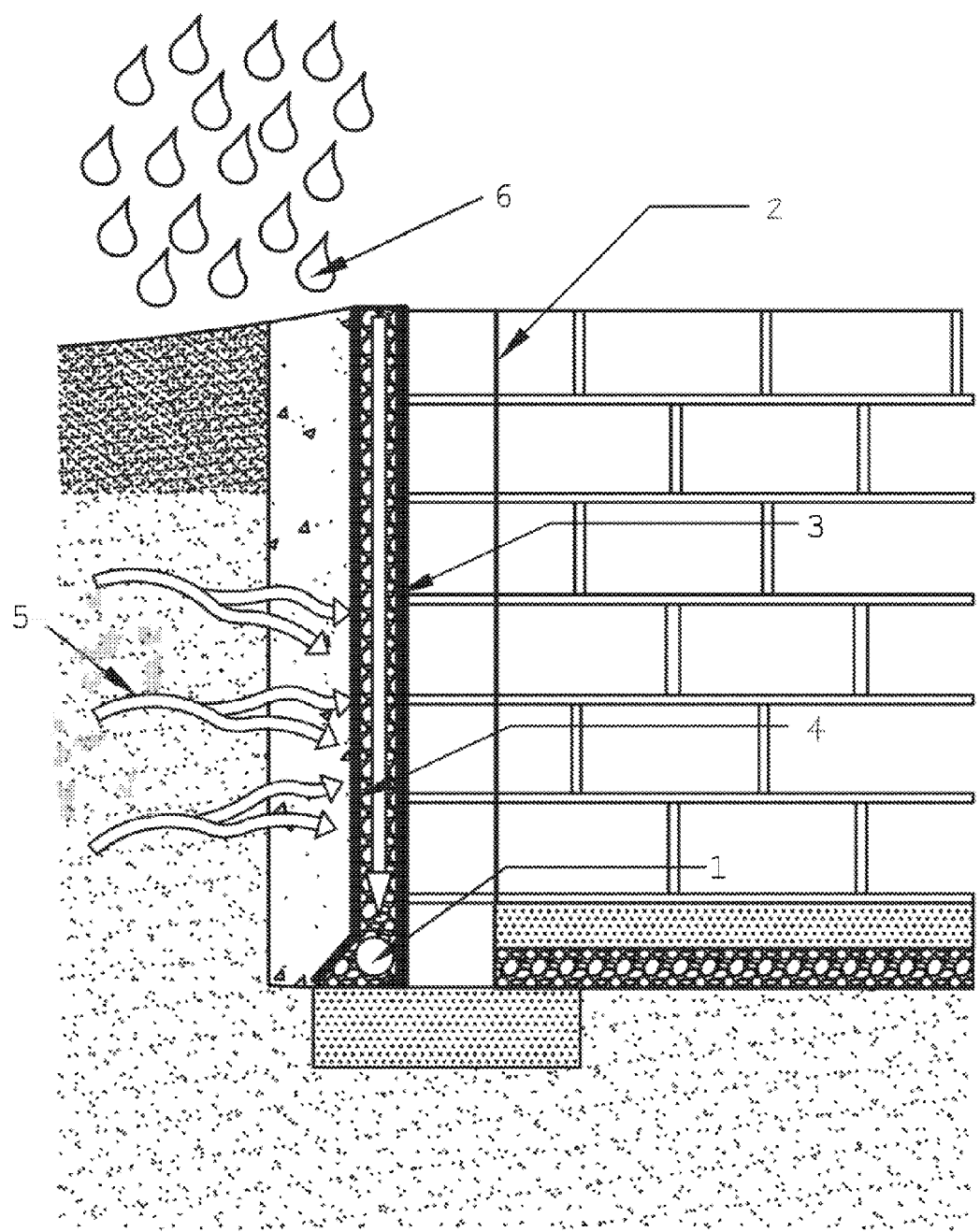
FIG. 1 is a perspective view of the use of the present invention after complete installation and how it works in new or existing homes or structures.

Generally speaking, the present invention describes a waterproofing drainage system 10 as shown in FIG. 1, to be installed in building structures with foundation walls for eliminating water seepage into walls leading to mold, mildew, and high humidity levels. Hereinafter, the waterproofing drainage system will be referred as "system" for future references in different embodiments of the present invention. Referring to FIG. 1, surface water 6 and ground water 5 enters the wall of clean washed stone 3 protected by large continuous filter fabric 4 and 15 flows freely by gravity to the French drain 1 in order to exit the foundation wall 2.

Figure 2:
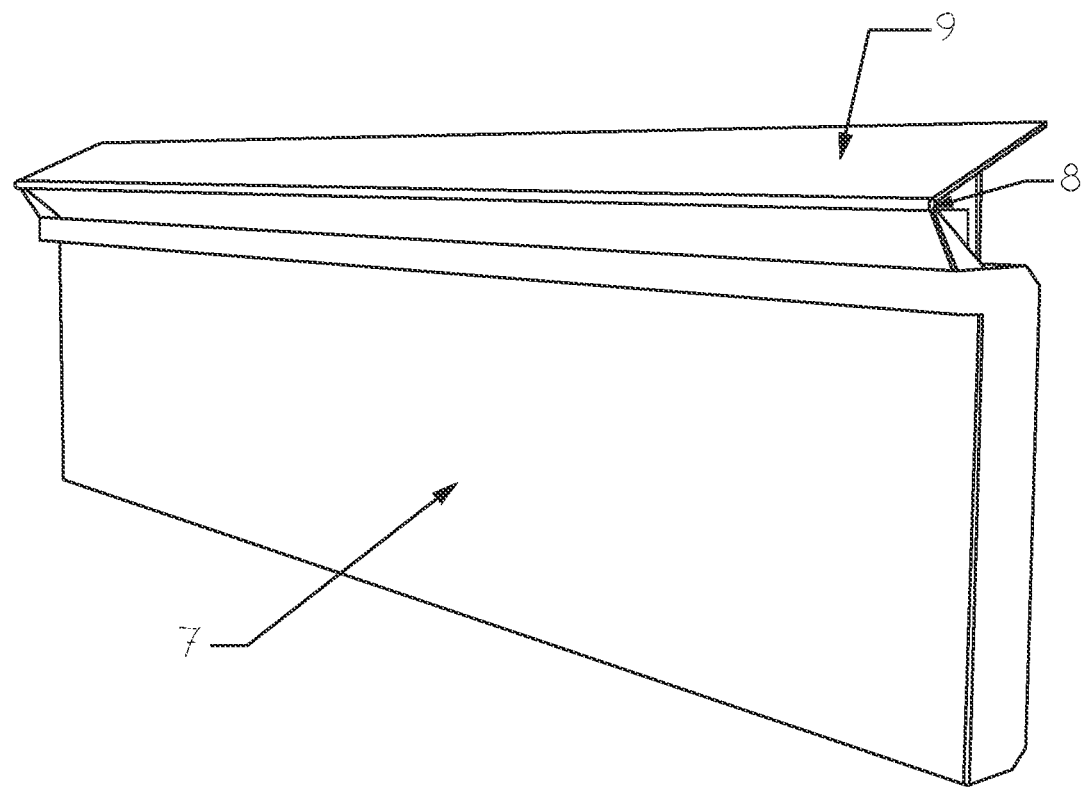
FIG. 2 shows front view of the present invention in one embodiment.

In reference to FIG. 2, the forms 7 used to install the system are of varied sizes to accommodate any type of foundation offset and are not limited to any specified dimension. The form 7 consists of a lid 9 that closes to protect the inside of the form from unwanted soil that creates hydrostatic pressure and opens to allow gravel 3 to be "funneled" behind 20 the form to allow any water to escape rapidly. The lid pivots on a continuous heavy duty piano hinge 8 and is also used to hold the filter fabric 4 in place during installation of system.

Figure 3:
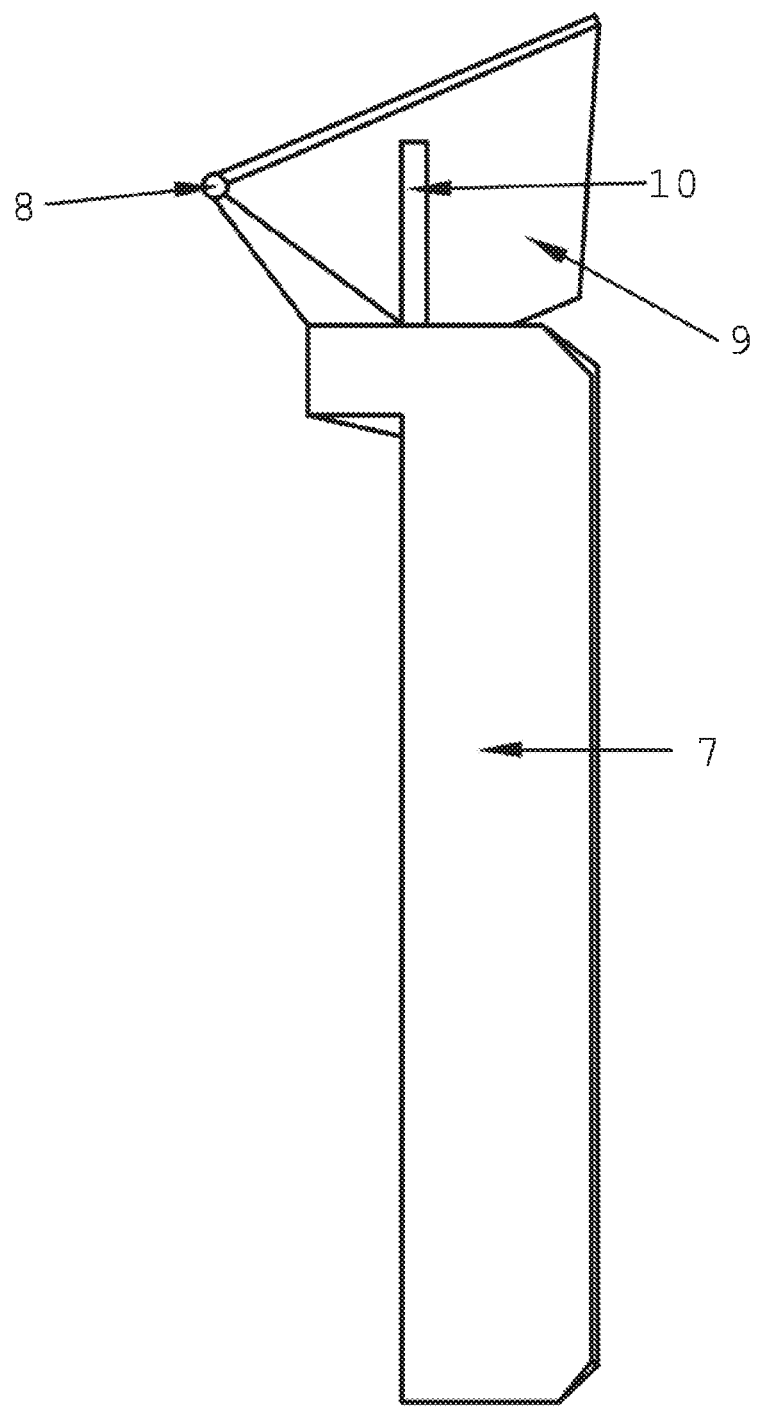
FIG. 3 shows side view of the present invention in one embodiment.

Referencing FIG. 3, a side view of the described form 7 used is shown with the piano hinge 8, the lid 9 that opens and closes, and one of the handles 10 that serves as a lid 9 support, a handle 10 to move or pull forms by hand, or the handle 10 can be used to pull 25 forms with chain and equipment when needed. Smaller versions of the described form can also be fabricated so no equipment is needed for noncommercial use.

Figure 4:
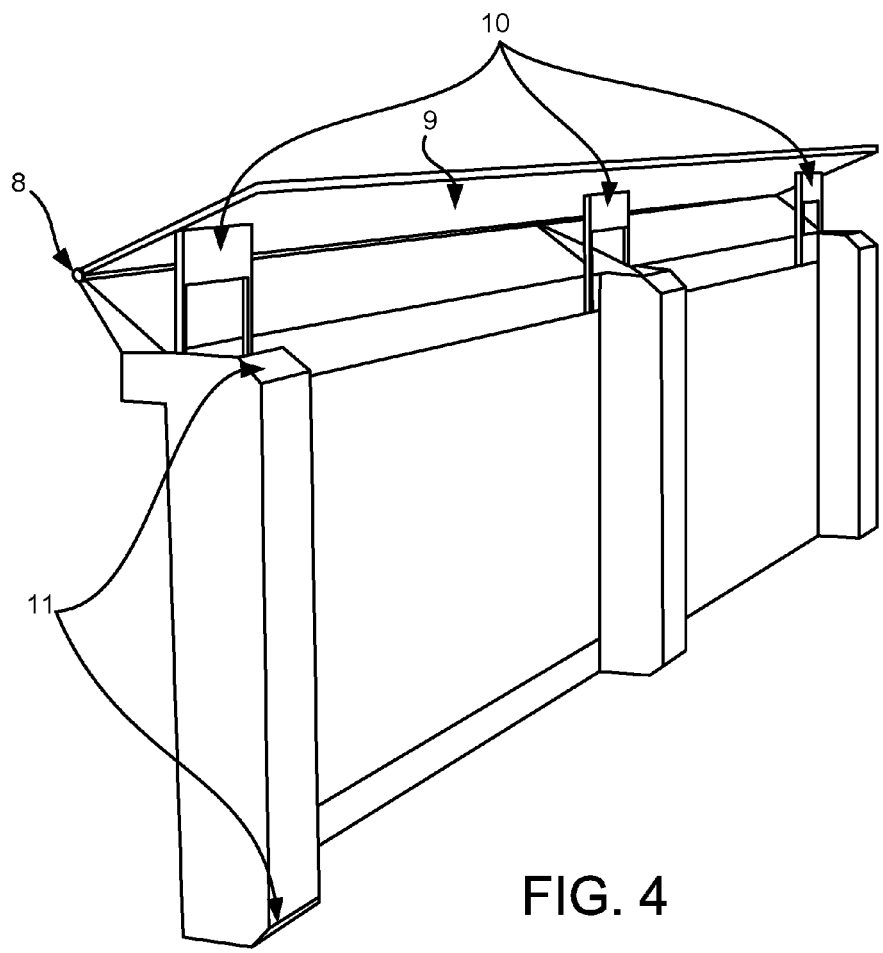
FIG. 4 shows a rear diagonal view of the present invention in one embodiment.

As shown in FIG. 4, a rear diagonal view is shown in the form 7 which, on the rear side of the form, shows a beveled or a curved top and bottom 11 to prevent damage to the waterproofing membrane on foundation wall 2 during removal.

Figure 5:
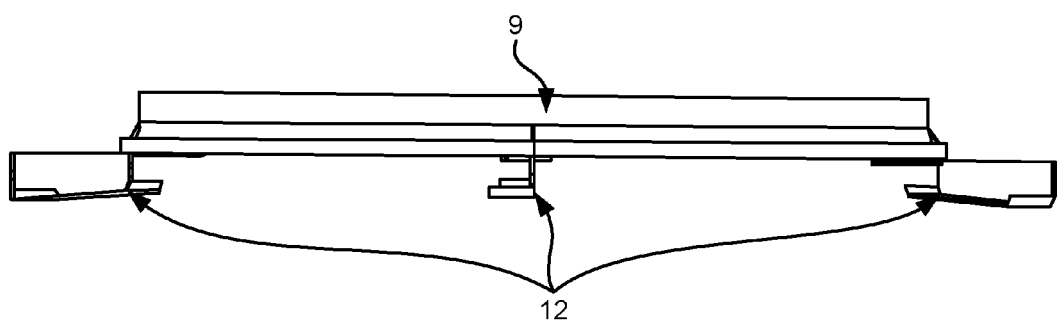
FIG. 5 shows a bottom view of the present invention in one embodiment.
Figure 6:
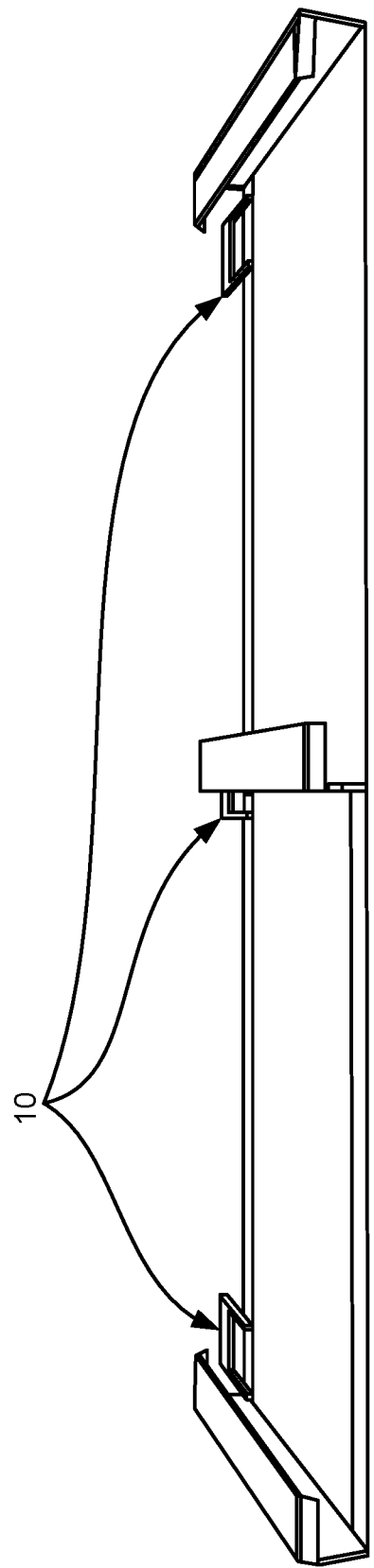
FIG. 6 shows an additional angled bottom view of the present invention in one embodiment.

In reference to FIGS. 5 and 6, which shows different views from the bottom of form 7 with the lid 9 being open. The form 7 is designed to allow easy passage of gravel 3 behind the form and unrestricted removal of form 7 from backfilled soil leaving the uniform wall of gravel 3. In addition, FIG. 6 shows another perspective view of the handles 10 used for lid 9 support, manual moving or pulling of forms, and/or removal of forms using a chain or rope with heavy equipment.

Figure 7:
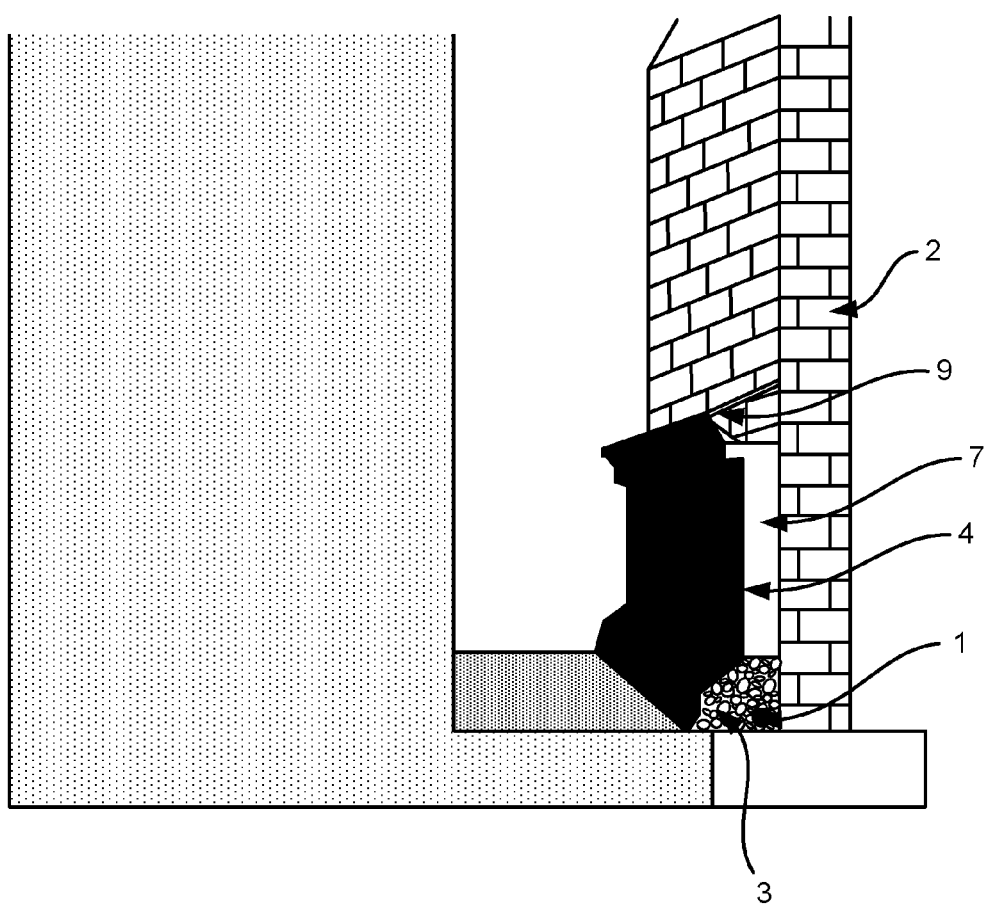
FIG. 7 shows the beginning of installation using the present invention in one embodiment.

FIG. 7 shows the first step in the installation process. With the French drain 1 already installed according to specified building code, the form 7 is positioned against the foundation wall 2 and on top of the gravel 3 surrounding the French Drain 1. A large piece 10 of filter fabric 4 (typically 12' tall or enough to reach top of foundation wall) is placed against the form 7, covering all gravel 3 surrounding French drain 1, lid 9 is then opened, and excess filter fabric 4 is placed inside the form 7. The lid 9 is then closed which holds the filter fabric 4 in place to prepare for backfill. This figure does not limit the French drain 1 in its position. It may also be installed beside the footing of the foundation. This figure does not limit the 15 type of drain used. The 4" French drain is typical.

Figure 8:
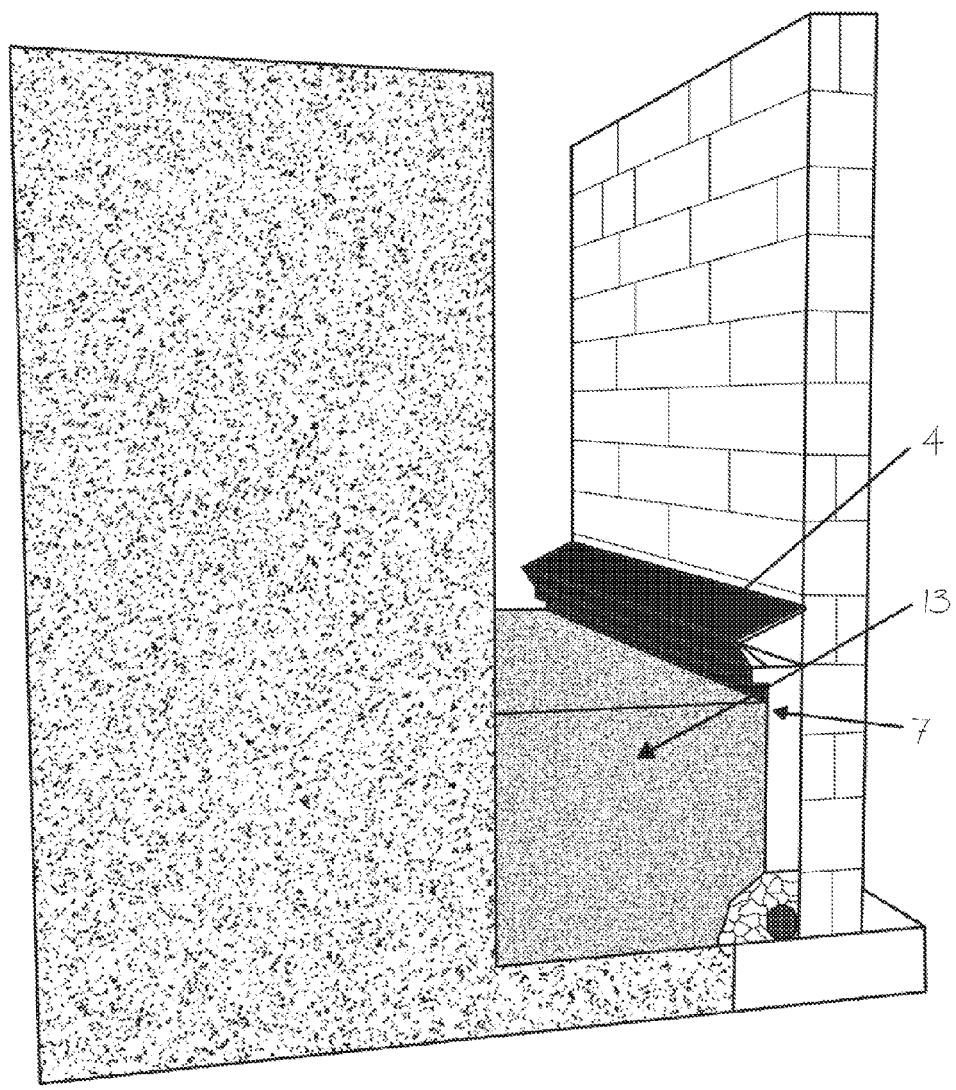
FIG. 8 shows the next step of installation using the present invention in one embodiment.

Referencing FIG. 8, the next step in the installation is shown. The backfill 13 is then placed against form 7 which is holding the filter fabric 4 in place with the closed lid 9. Backfill 13 is added in 6-8" lifts according to specified building code or engineered requirements and compacted when foundation walls are sufficiently reinforced. This process is continued until 20 top of the flat portion of the form 7 is reached.

Figure 9:
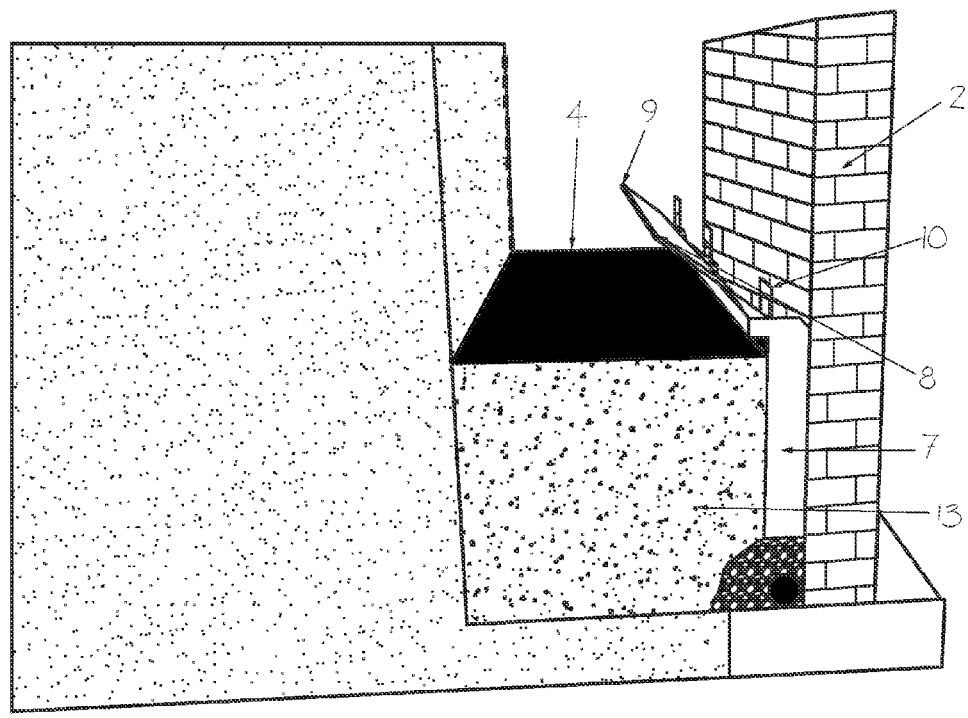
FIG. 9 shows the next step of installation using the present invention in one embodiment.

In FIG. 9, the lid 9 on the form 7 is then opened, pivoting on the piano hinge 8, and the filter fabric 4 is pulled out from inside the form 7 and laid on top of the backfill 13. The opened lid 9 also serves as an extended "funnel" for the gravel 3 to be easily installed. As shown, the handles 10 being open in their design, do not restrict the flow of gravel 3 into 25 the inside of form 7 and against the foundation wall 2.

Figure 10:
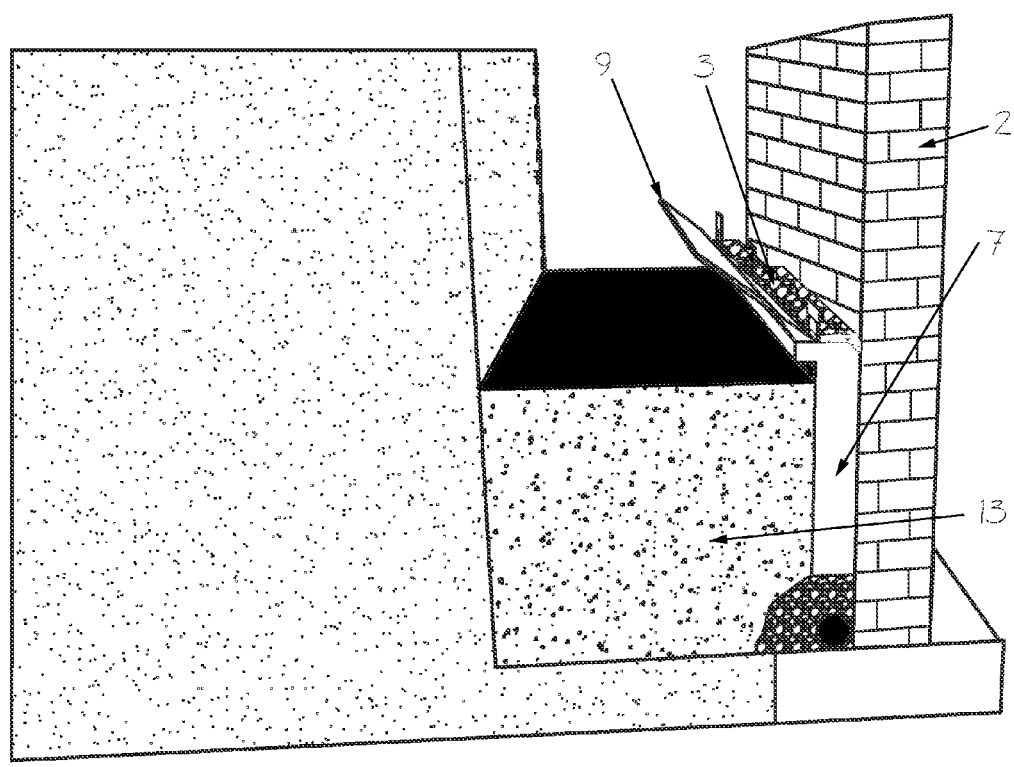
FIG. 10 shows the next step of installation using the present invention in one embodiment.
Figure 11:
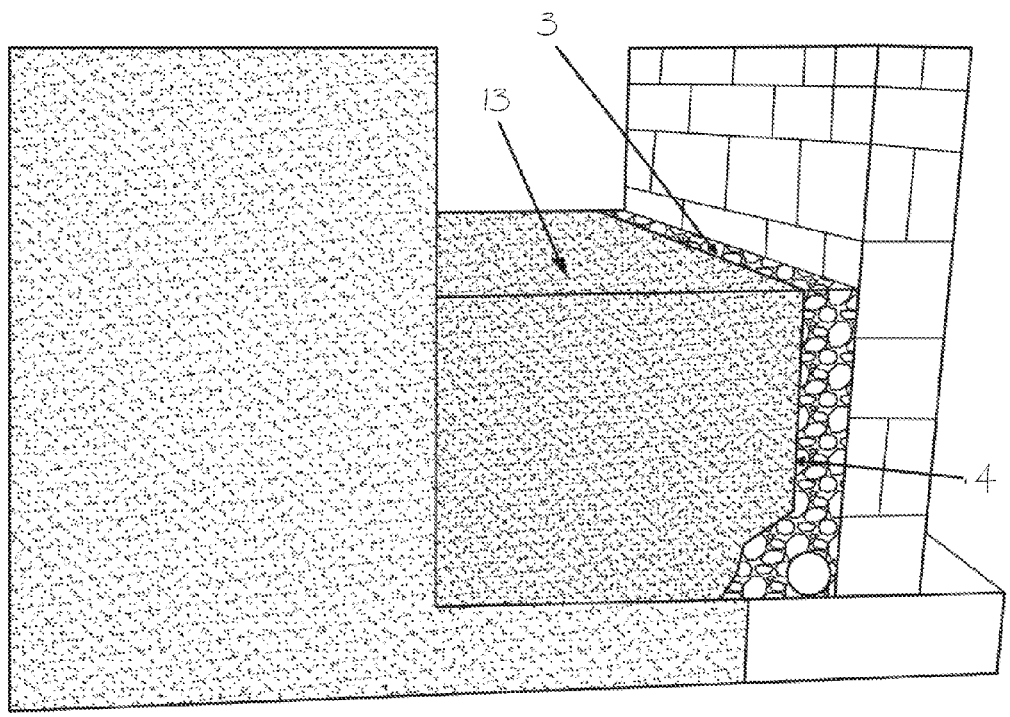
FIG. 11 shows the next step of installation using the present invention in one embodiment.

In FIG. 10, the gravel 3 is then dumped or poured on top of lid 9 funneling it behind the form 7 and against the foundation wall 2. This is continued until top of form 7 is reached. At this point the gravel 3 is approximately the same height of the backfill 13. In order to remove the form 7, a chain or rope can be hooked to the handles/lid supports 10 on the form, then attached to heavy equipment (if desired) and pulled out of the backfill 13 leaving a 4" wall of gravel 3 and compacted backfill 13 separated by filter fabric 4 as shown in FIG. 11. If desired, smaller forms 7 can be used in order to remove forms 7 manually.

Figure 12:
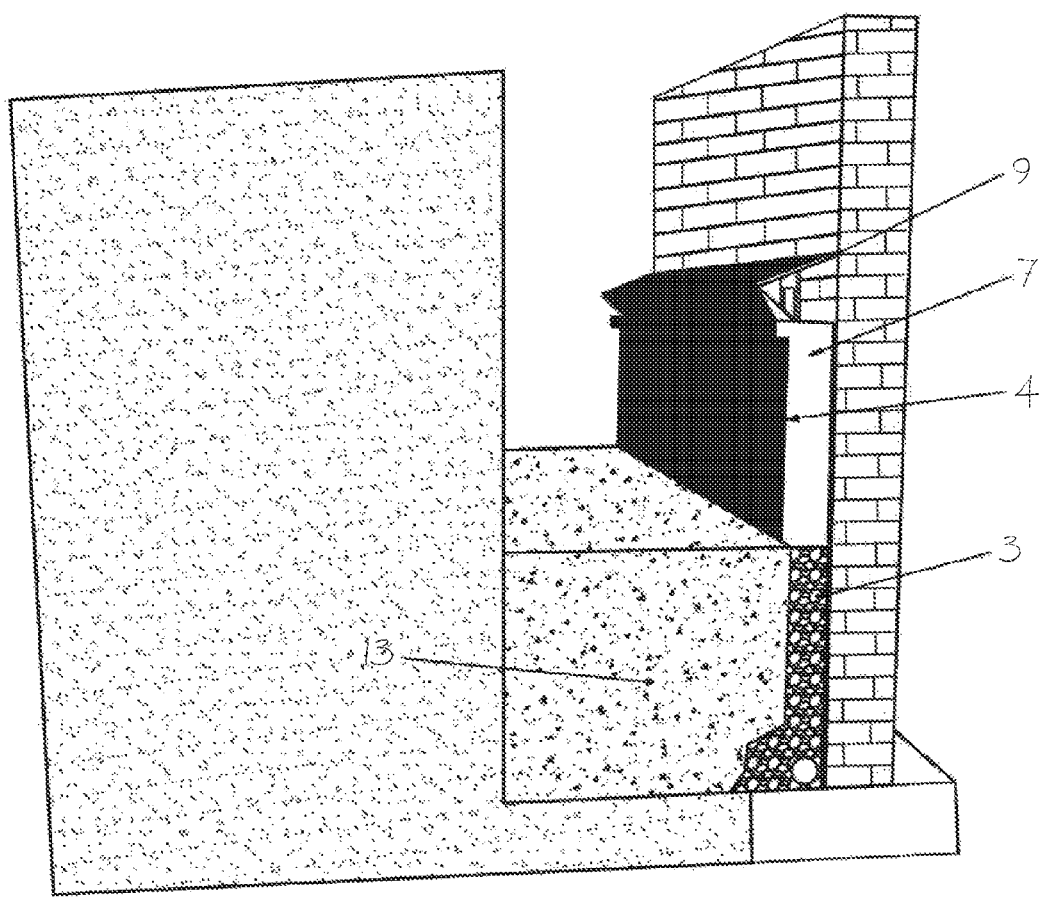
FIG. 12 shows the next step of installation using the present invention in one embodiment.
Figure 13:
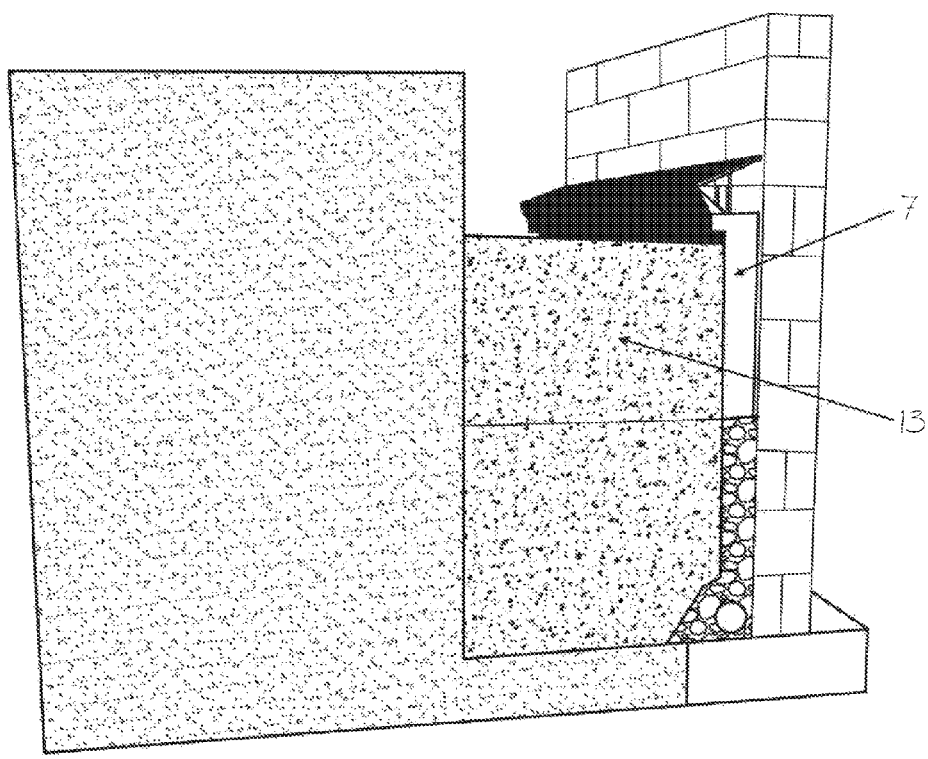
FIG. 13 shows the next step of installation using the present invention in one embodiment.
Figure 14:
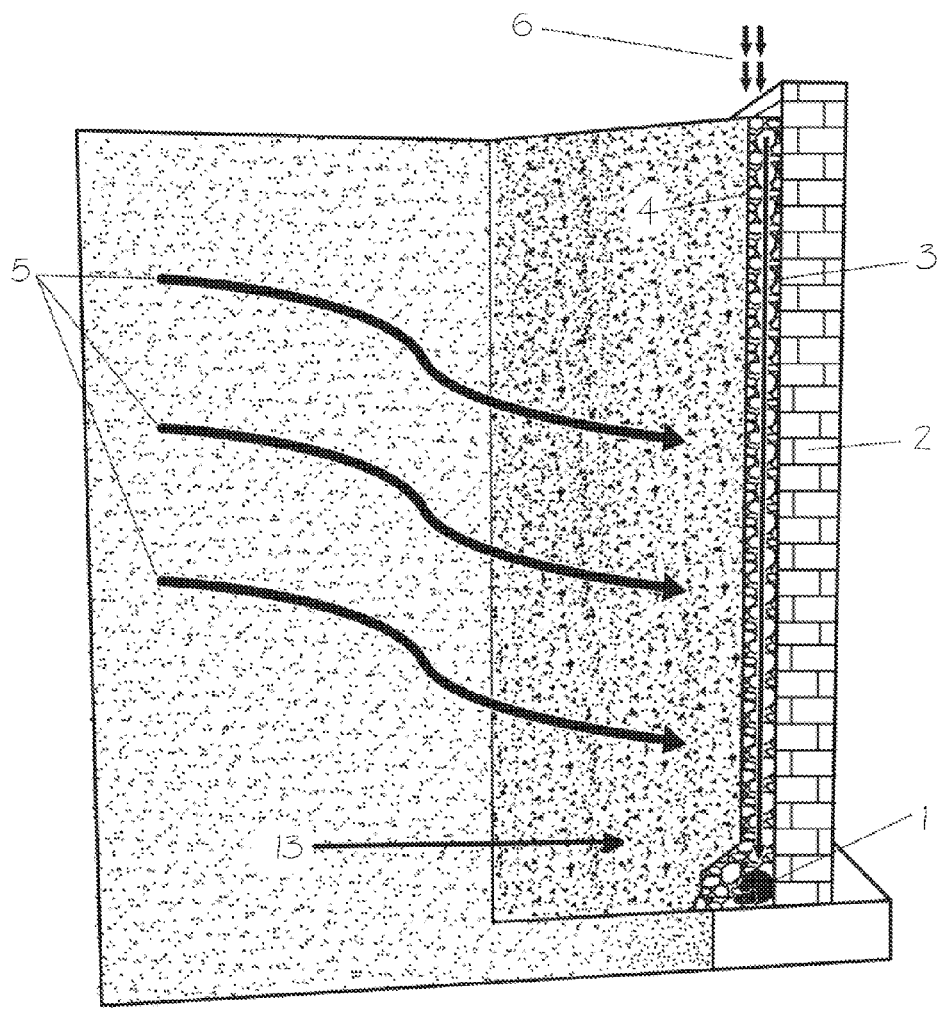
FIG. 14 shows the side view of completed installation after using the present invention in one embodiment.

FIG. 12 shows the next step in the installation process. The form 7 is placed on top the existing wall of gravel 3 and filter fabric 4 is pulled off top of backfill 13, up the front of the form 7, and placed inside of form 7 again. The lid 9 is then closed, holding the filter cloth 4 in place. As shown in FIG. 13, the next series of backfill 13 is installed in 6-8" lifts until the top of the flat portion of the form 7 is reached. The lid 9 of the form 7 is then opened and the excess filter fabric 4 is removed and laid on top of the backfill 13 again. Gravel 3 is 10 then poured on top of lid 9 funneling it behind the form 7. When gravel 3 reaches the same height of the backfill 13, the form 7 can then be pulled out leaving a uniform 4" wall of gravel 3 and compacted backfill 13 separated by filter fabric 4. This entire process is repeated until desired grade is reached. FIG. 14 shows a typical completed system installed showing the compacted backfill 13 and the 4" wall of gravel 3 separated by filter fabric 4. Soil or silt will 15 never clog the system due to its design keeping the soil beside the system instead of being on top. The filter fabric 4, which extends from the bottom of the French drain 1, all the way to the top of grade and around top of gravel wall 3 also restricts silt or soil from entering the system. FIG. 14 illustrates how this system can rapidly exit ground water 5 or surface water 6 and keep it from penetrating the foundation wall 2 due to the absence of hydrostatic 20 pressure and rapid rate of water removal. Even if the water 5,6 does reach the foundation wall 2, it will exit the water so quickly it will not even have time to be absorbed into the foundation wall 2 even with no waterproofing membrane installed on the foundation wall 2. Once the water 5, 6 hits the bottom, it then enters into the French drain 1 and exits the foundation as quickly as it enters.

Figure 15:
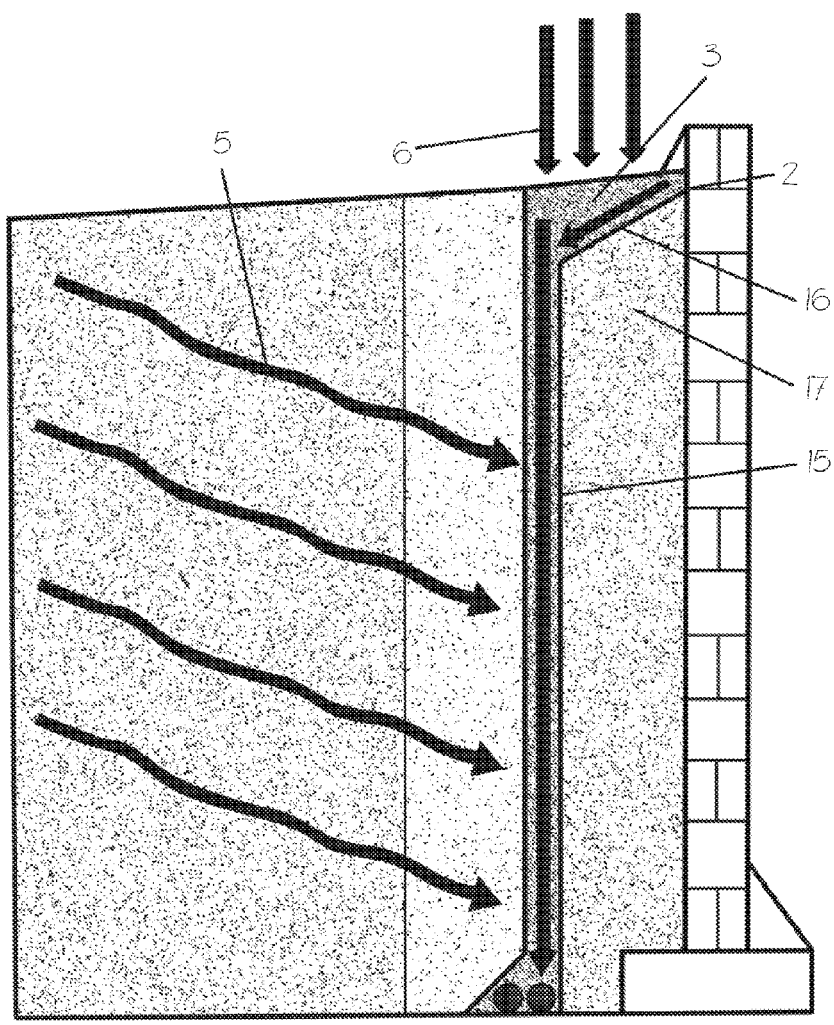
FIG. 15 shows a perspective view of another method of installation of the use of the present invention after complete installation and how it works in existing homes or structures.

FIG. 15 shows another very effective installation procedure of the system in existing older homes with foundations that are not properly reinforced. Excavation of the foundation is completed approximately 3-4' away from foundation wall typically all the way to the bottom of the footing (minimum 4" below top of basement slab). This significantly reduces lateral pressure on the structure caused by excavation and mechanical compaction which results in a significantly reduced risk of damaging fragile foundation walls that are not properly reinforced. An impermeable membrane 15 (recommend 20 mil reinforced poly) is installed behind the system and then attached to the foundation wall 2. The grade under the impermeable membrane near the top of grade 16 is sloped so that surface water 6 will filter through the gravel 3, enter the system, and rapidly exit the perimeter of the foundation. The installation process is the same with the exception of the top of grade. Extra gravel 3 is used at the top the system to capture additional surface water 6 from possible overflowed gutters or clogged downspouts. Surface water 6 is properly drained because no settlement can take place due to the undisturbed soil 17 and self-compacting gravel 3 10 surrounded by filter fabric 4. Ground water that enters the wall of gravel 3 exits rapidly also. This installation process is also superior to any other because it can be installed on any structure regardless of the age without removing decks, porches, or retaining walls.

In addition, this method of installation eliminates need to use bracing on inside of foundation wall to ensure pressure from excavation and compaction does not damage the 15 foundation, eliminates the need to remove old waterproofing membrane which is very labor intensive, eliminates need to prepare walls for new waterproofing membrane which includes repairing any holes in foundation wall and pressure cleaning wall to ensure proper bonding of waterproofing agent.

Furthermore, this method of installation of the system eliminates need of expensive 20 waterproofing membrane (tar or asphalt emulsion) and the need of sealing under and around porches or decks with new block walls. This method of installation of the system is very cost efficient. The cost to properly repair existing homes with wet basements (from the exterior) is reduced by approximately 50% meaning that no company can repair existing homes with wet basements as cost effectively as this method. This method is proven effective after being installed on an older home. After thirteen inches of rain in seven days, the basement, which before flooded badly in minor rains, remained bone dry after a record breaking week of rain.

Figure 16:
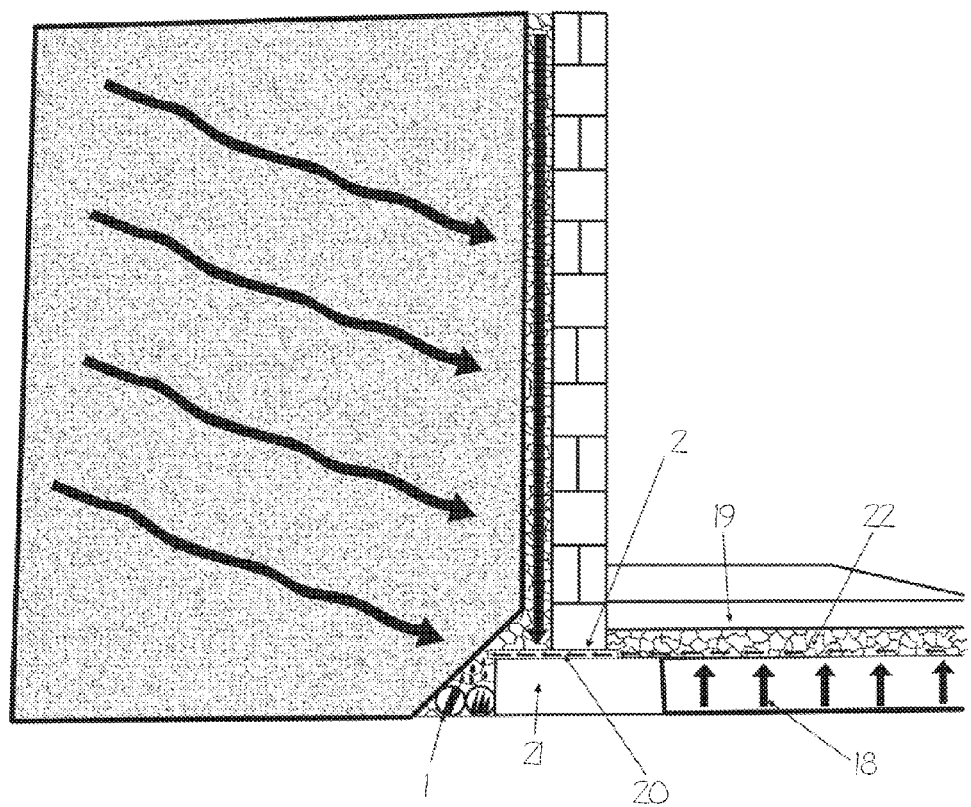
FIG. 16 shows a perspective view of an additional installation to incorporate under slab water removal into the system.
Figure 17:
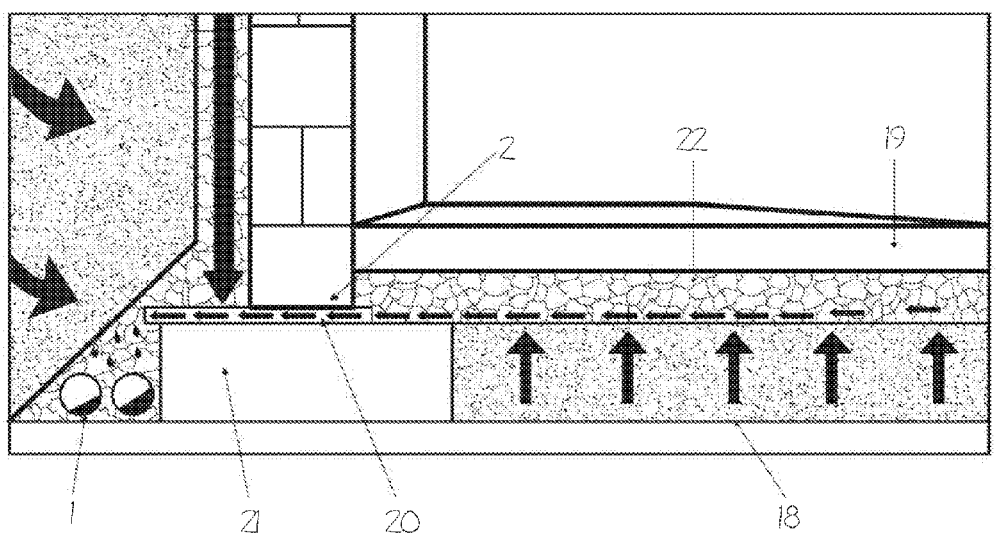
FIG. 17 shows a closer view of FIG. 16.

In addition to all the described benefits of the system, under slab water removal can also easily be incorporated into the system as illustrated in FIGS. 16 and 17, any water that rises 18 under an existing or new slab 19 also be removed through installation of pipes (PVC or aka weep holes) 20 at the base of the foundation wall 2. In FIG. 16, preferably, PVC pipes 20 are installed around the perimeter base of a foundation wall 2 on top of the footing 21, and into the typical gravel bed under a foundation slab 22. As a result, water, which seeks its own level, will rise into the gravel bed 22, under the foundation slab 19, enter the PVC pipe 20, and then will enter the French drain 1, which is lower than the base of the gravel bed 22, to exit the structure as shown in the close up view on FIG. 17.

This system is far superior to interior systems in every way possible. This system removes all water before it gets to the foundation wall. On interior systems, some water is 10 also left on the top of the footing because of high and low spots on the average footing. In basements with finished living area, the floor covering and wall covering have to be removed in order to install interior systems. Interior systems cannot remedy wet or damp basement walls. The system eliminates the need for sump pumps in the basement reducing energy costs, noise, and the expense of purchasing dehumidifiers. The system makes the basement 15 healthier and eliminates the need of covering basement walls with white plastic or panels that drain water into interior systems. Covering block foundation walls with an impermeable barrier keeps all the moisture inside the block walls where it becomes stagnant, never allowing the block walls to dry out which can corrode foundation walls over time due to acidic rain water. The system preserves the foundation walls, inside and out, in a completely 20 dry state. This system is also easy to install and averages approximately half the cost of interior waterproofing systems while maintaining an average 30% profit margin for the installation company who is properly trained with sufficient forms.

Many low lying lands today are useless because they are simply too wet to plant crops, build homes, or install septic systems. These useless, saturated plots of land can now be dried by using the system to construct cost-effective curtain drains along their property lines to re-route ground water that is saturating the soil. Furthermore, the system is usually installed 4" wide due to cost savings; however, it can also be installed 8", 12", 16", or any desired width to accommodate specified drawings by using simple spacers behind the forms.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

I claim:

1. Apparatus for use in installing a drainage system below grade and about the exterior of the foundation of a building, the apparatus comprising a reusable rigid form adapted for placement over a drainage pipe and about the exterior of the foundation and extending therefrom to define a space between the foundation and the soil surrounding the foundation, the form comprising a vertical wall for placement extending parallel to the foundation and defining an area spaced therefrom, the vertical wall having a top and a bottom; spacer members fixed to the form wall at spaced-apart intervals and separating the form wall from the foundation by a predetermined distance to define the area spaced from the foundation; handles extending vertically upwardly from the vertical wall for installing and removing the form from placement about the exterior of the foundation; an extension member extending at an angle from the top of the vertical wall in a direction opposite the spacer members; and a lid hingedly attached to the extension member that closes against the foundation wall to cover the area defined between the foundation and the form wall and opens to provide ingress to the area; whereby the form may be placed in an excavation about a foundation and over a drainage pipe for installation of a drainage system of the type in which a plurality of clean, washed stones is placed adjacent the foundation and over the drainage pipe, the form being removed after installation of the drainage system.

2. The apparatus of claim 1 wherein the predetermined distance defined between the foundation and the form wall is from about 4 inches to 16 inches.

3. The apparatus of claim 1 wherein the handles support the lid when closed.

4. The apparatus of claim 1 wherein the hinge is a piano hinge that is the length of the top of the vertical wall of the form.

5. The apparatus of claim 1 wherein the spacer members extend vertically having a top and a bottom corresponding to the form wall and wherein the top and bottom of the spacer members are beveled; wherein damage is substantially precluded to waterproofing membrane that may be fixed to the exterior foundation wall.

6. Apparatus for installing a drainage system for water management below grade and about the foundation of a building, the system having at least one drainage pipe adjacent the foundation for removal of water, the installation apparatus comprising the reusable rigid form of claim 1; a plurality of washed stones for placement through the open lid of the rigid form to fill the defined area over the at least one drainage pipe and spaced from the foundation; and a filter fabric for placement over the form opposite the spacer members, the filter fabric folded over the closed lid and held in place thereby against the foundation until opened for ingress by filling with a plurality of washed stones, the filter fabric substantially precluding soil from entering the gravel, whereby upon installation of the filter fabric and rigid form over the at least one drainage pipe and filling the defined area with the stones, the rigid form may be removed to leave the filter fabric and stones in place and reused to fill washed stones to grade, the filter fabric extending to grade and over the stones to substantially preclude soil from entering the stones through the filter fabric and to promote removal of water through the at least one drainage pipe.

7. The apparatus of claim 6 wherein the filter fabric is folded over the closed lid and held in place thereby against the foundation, and unfolded over the soil adjacent the form when the lid is open; whereby the filter fabric is secured against the foundation wall when the lid is closed and can extend the length of the foundation wall as the defined area is filled with stones.

8. The apparatus of claim 6 wherein the filter fabric extends from the bottom of the at least one drainage pipe to cover the stones at grade.

9. The apparatus of claim 6 further comprising waterproofing components applied to the foundation, the waterproofing components applied to the foundation prior to installation of the form and remaining after removal of the form.

10. The apparatus of claim 6 further comprising additional drainage pipes for removing water from a slab at the base of the foundation and supplying that water to the at least one drainage pipe for removal.

* * * * *